April 1, 1969

T. A. DONALDSON 3,436,059

ROTARY INDICATOR PADDLE

Filed March 3, 1966

INVENTOR
THOMAS A. DONALDSON

BY Brown & Rosen

United States Patent Office 3,436,059
Patented Apr. 1, 1969

3,436,059
ROTARY INDICATOR PADDLE
Thomas Alexander Donaldson, Newark, Del., assignor to J. M. Huber Corporation, Locust, N.J., a corporation of New Jersey
Filed Mar. 3, 1966, Ser. No. 531,384
Int. Cl. B01f 7/16; G01f 23/22
U.S. Cl. 259—135                         1 Claim

ABSTRACT OF THE DISCLOSURE

A rotary paddle capable of being inserted through a relatively small opening in a tank and having an effective cross section to be retarded by powdery material to thereby provide an indication of the quantity of material in that portion of the tank is disclosed.

---

Figures 1, 2:
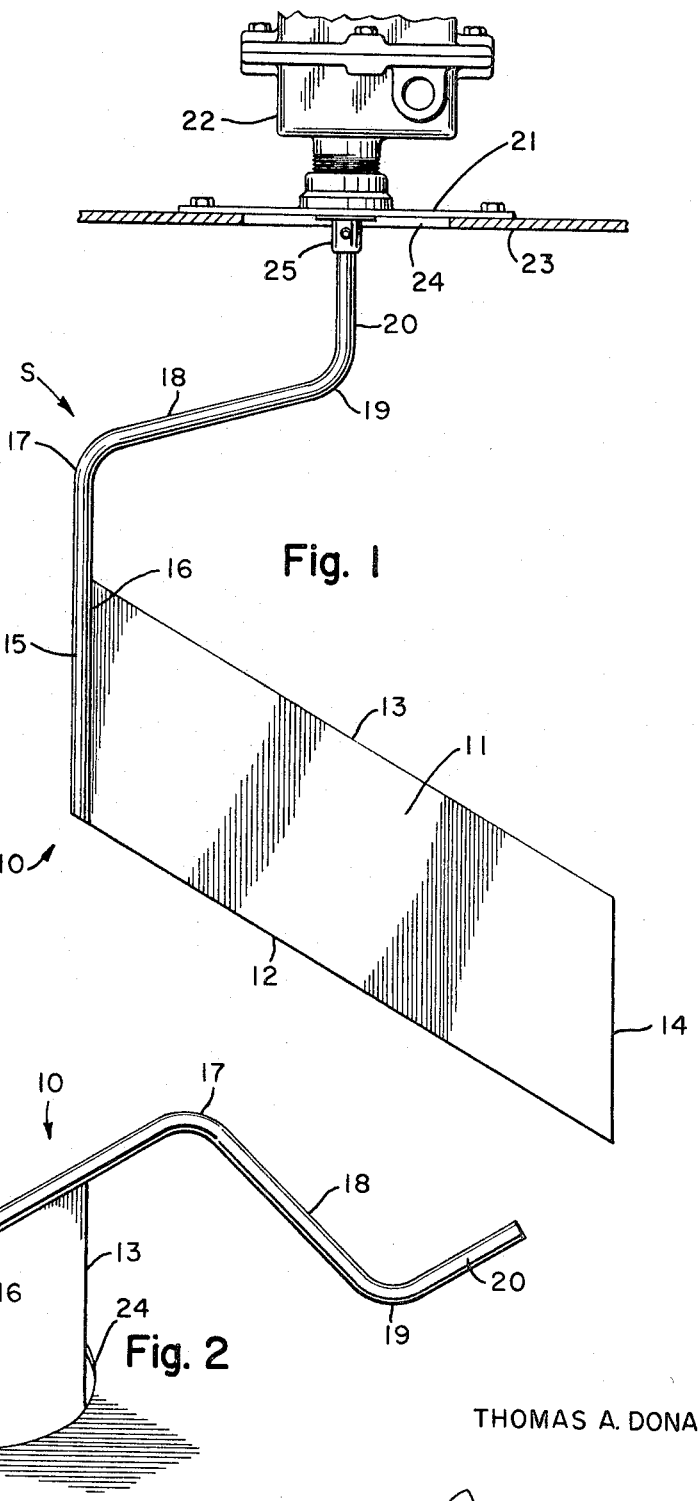

The present invention relates to a paddle for rotary indicators of the type used for measuring the height of powdered material in a bin.

Bin level indicators of the type disclosed in U.S. Patents 2,698,362, 2,851,553 and 2,909,766 operate by having a paddle structure extending into the bin while being continuously rotated by a low powered electric motor. As the contents of the bin cover the blades of the paddles the load on the electric motor is substantially increased and a signal system is actuated by the increased loads to indicate that the bin contents are at least as high as the paddle blades. In some instances a second indicator at the bottom of the bin will have its load released by emptying of the bin and again a signal system is actuated by the change in load on the motor. The bin normally has a four inch opening through the top or side thereof to permit the insertion of the paddles with the opening being covered by a cover plate forming a part of the motor housing of the indicator. This structure can be seen in FIGURE 4 of U.S. Patent 2,851,553 mentioned above. With relatively dense powdered material in the bin the four inch blades normally used provide enough contact with the powdered material so that considerable change in load on the motor takes place as the blades are covered with the powdered material. However, in many instances extremely fluffy light weight powdered material is stored in the bins and with such material the four inch blades of the prior art do not provide enough contact and hence the load changes on the motor are insufficient to operate a signaling system.

The primary object of the present invention is to provide a rotary indicator paddle of substantially increased contact area.

Another object of the invention is to provide a paddle of the class described above which can be inserted through a relatively small opening in the bin.

Other objects and advantages will become apparent in the following specification when considered in light of the attached drawings, in which FIGURE 1 is a side elevation of the invention shown partially broken away and in section, and FIGURE 2 is a fragmentary side elevation of the invention showing its insertion into the bin.

Referring now to the drawings wherein like reference characters indicate like parts throughout the several figures, the reference numeral 10 indicates generally a rotary indicator paddle constructed in accordance with the invention.

The indicator paddle 10 includes a relatively stiff flat blade 11 having a sloping bottom edge 12 and a sloping top edge 13 extending parallel to the edge 12. The blade 11 has an outer edge 14 which is vertical and connects the lower edge 12 to the upper edge 13.

A shaft S has a lower portion 15 secured to the edge 16 of the blade 11 with the lower portion 15 parallel to the edge 14 of the blade 11. The lower portion 15 is vertical and the edges 12–13 of the blade 11 extend downwardly and outwardly at an angle of 120° thereto. The shaft S is bent at 17 and has an upwardly and inwardly extending median portion 18 integrally formed therewith. The shaft S is bent again at 19 and has an upper portion 20 integrally formed therewith. The portion 20 of the shaft S is vertical and is arranged with its axis intermediate the edges 14–16 of the blade 11. The bends 17 and 19 in the shaft S are equal and are approximately 105°.

A mounting plate 21 is positioned above the blade 11 and supports a motor 22. The mounting plate 21 is mounted on the top surface of the bin 23 which has an opening 24 extending downwardly therethrough. The shaft S is secured to the motor shaft 25 for rotation therewith.

The distance separating the edges 12–13 of the blade 11 is slightly less than the dimension of the hole 24 so that the blade 11 may be inserted through the hole 24 as can be seen in FIGURE 2 and then rotated into position so as to be finally mounted as illustrated in FIGURE 1. The construction of my blade 11 in the manner described above makes it possible to mount the shaft S in a conventional motor 22 and pass the blade 11 through a conventional hole 24 in the bin 23 securing therewith a conventional mounting plate 21. With my invention the bin may be used for both extremely dense powders and with extremely fluffy powders by merely changing the particular blade 11 used with the motor 22.

With the prior art structures illustrated in the patents mentioned above the blades can only be elongated along the axis of the motor shaft to increase the contact area and still be able to be inserted through the same size opening in the bin wall. In order to materially increase the contact of blade and powder the blades must be elongated far beyond the practical with a resultant reduction of accuracy.

My blade 11 can be inserted through openings in either the top or side of the bin with equal facility.

Having thus described the preferred embodiment of the invention it should be understood that structural modifications and adaptations may be resorted to without departing from the scope of the appended claim.

I claim:
1. A rotary indicator paddle of the type adapted to be removably inserted into a container for powdered material through a relatively small opening therein only slightly larger than the width of the paddle blade and extending into the container to be rotated by motor means the load on which provides an indication of the quantity of powdered material acting to retard said paddle in that portion of the container, wherein the improvement comprises a shaft, a relatively stiff flat blade having a length at least twice its width and having an edge integrally secured along said shaft adjacent the lower end thereof, said blade sloping downwardly and outwardly from said shaft, said shaft having a median portion sloping inwardly and upwardly from the lower end portion thereof and an upper portion extending upwardly from said median portion, said upper portion and said lower portion having their axes parallel with the axis of said upper portion arranged intermediate the opposite end edges of said blade.

References Cited

UNITED STATES PATENTS

| | | | |
|---|---|---|---|
| 2,035,646 | 3/1936 | Farrington | 259—108 |
| 2,073,925 | 3/1937 | Farrington | 259—107 |
| 2,909,766 | 10/1959 | Bozich | 340—246 |
| 3,295,836 | 1/1967 | Langella | 259—122 |

WILLIAM I. PRICE, *Primary Examiner.*

U.S. Cl. X.R.

259—108; 340—246